United States Patent [19]

Kuroyanagi et al.

[11] 4,367,484
[45] Jan. 4, 1983

[54] PICTURE-IN-PICTURE COLOR TELEVISION RECEIVER

[75] Inventors: Tomomitsu Kuroyanagi, Yokohama; Hitoshi Miyagawa, Shiga, both of Japan

[73] Assignee: Hitachi, Ltd., Tokyo, Japan

[21] Appl. No.: 210,812

[22] Filed: Nov. 26, 1980

[30] Foreign Application Priority Data

Nov. 28, 1979 [JP] Japan .................................. 54-152885

[51] Int. Cl.³ ......................... H04N 9/535; H04N 5/22
[52] U.S. Cl. ........................................ 358/22; 358/29
[58] Field of Search .................... 358/22, 29, 181, 183, 358/34

[56] References Cited

U.S. PATENT DOCUMENTS 3,647,944  3/1972  Anderson ............................... 358/34
3,778,542  11/1973  Hanseman .............................. 358/22
4,267,560  5/1981  Ishikawa et al. ....................... 358/22

FOREIGN PATENT DOCUMENTS 2245070  3/1974  Fed. Rep. of Germany .

*Primary Examiner*—John C. Martin
*Attorney, Agent, or Firm*—Antonelli, Terry & Wands

[57] ABSTRACT

A picture-in-picture color television receiver for simultaneously displaying on a screen a first and a second picture read out from a memory in a state that the second picture is inserted in the first picture, is disclosed. A DC restoration circuit for DC-restoring a color difference signal of the second picture DC-restores a color difference signal of the second picture at the reference level coincident with the reference level of the color difference signal of the first picture, thereby to make the white balance of the first picture coincident with that of the second picture.

2 Claims, 5 Drawing Figures

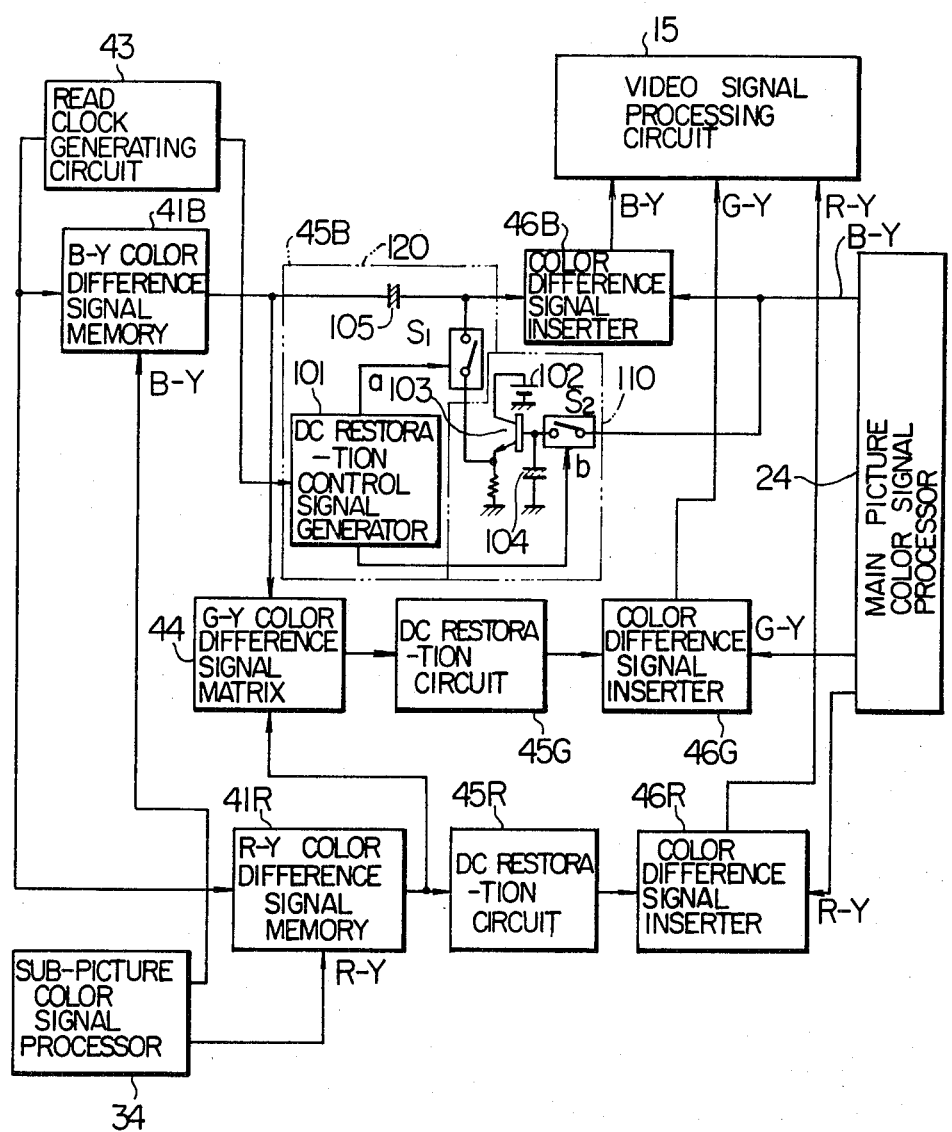
F I G. 5

PICTURE-IN-PICTURE COLOR TELEVISION RECEIVER

BACKGROUND OF THE INVENTION

The present invention relates to a television receiver for simultaneously displaying a plurality of programs on a single screen of a television receiver.

A demand of effective use of a television screen drives one to recently develope a television receiver of the type in which a small size picture (hereinafter referred to as a sub-picture) is displayed in a large size picture (hereinafter referred to as a main picture), those pictures being assigned for different programs, respectively, as disclosed in Japanese Laid-open Patent Publication No. 2419/74, DT-OS No. 2,239,593, and electronics journal "Nikkei Electronics" Dec. 26, 1977, p.p. 127 to 134 published in Japan. This type of the television receiver is generally called a picture-in-picture (PinP) television. The PinP television will be described in brief referring to FIGS. 1 to 3.

In FIG. 1 illustrating a concept of the PinP TV, reference numeral 1 designates a TV receiver; 2 a cathode ray tube (hereinafter referred to as a CRT); 3 a main picture portion; 4 a sub-picture portion having a picture different from that in the main picture portion. The main picture and sub-picture portions are so arranged as to individually select different channels for displaying pictures of the selected channels.

FIG. 2 diagramatically illustrates an example how the sub-picture is inserted into the main picture. In the figure, reference character I designates the sub-picture before its size is reduced and II the main picture with the sub-picture reduced. It is assumed now that a picture reduction rate of the sub-picture is ⅓ for both the vertical and horizontal sides of the picture. Here, the picture reduction rate is defined as a ratio of a scanning period after it is reduced and a scanning period of the original signal. The scanning lines are extracted from the sub-picture before it is reduced, one for three scanning lines. The horizontal period is time-reduced into ⅓. Then, it is synchronized with the main picture. Finally, thus processed picture is inserted into the main picture. Scanning lines 1 to 3 are exemplary lines of those of the picture before and after it is reduced.

FIG. 3 is a circuit construction of part of a conventional PinP TV receiver, which relates to the present invention. In the figure, reference numeral 11 designates an antenna; 12 a sub-picture insertion circuit; 13 a video signal processing circuit; 14 a display device using a CRT; 21 and 31 tuners for the main picture and sub-picture; 22 and 32 IF video detecting circuits for the main picture and sub-picture, respectively.

A signal for the sub-picture is stored into a memory 41 under control of a synchronizing (hereinafter abbreviated as a sync) signal obtained from a sync separation circuit 33 and a clock signal from a write clock generating circuit 42. Reference numeral 43 designates a read clock generating circuit. The sub-picture signal from the memory 41 is read out under control of the signal from the sync separation circuit 23 for each scanning line, and then is inserted into a main picture signal. The example is for a case where both the main picture and sub-picture are of the monochrome type.

When both the pictures are of the color type, the sub-picture signal is read out from the memory, and the read out one and the main picture signal are composed. The reference level of the color difference signal changes due to temperature drift and aging of the circuit components. As a result, the white balance by the main picture signal is not coincident with that by the sub-picture signal.

SUMMARY OF THE INVENTION

Accordingly, an object of the present invention is to provide a PinP color television receiver in which the demodulated color signal reference level of the second picture signal read out from the memory is made coincident with that of the demodulated color signal of the first picture signal, whereby the white balance by the first picture signal is coincident with that by the second picture signal.

BRIEF DESCRIPTION OF THE DRAWINGS

FIG. 5 is a block diagram partially including a circuit diagram which is useful in explaining in detail a part of the circuit shown in FIG. 4.

DESCRIPTION OF THE PREFERRED EMBODIMENT

An embodiment of a PinP color television receiver according to the present invention will be described in detail referring to the accompanying drawings.

Figure 3:
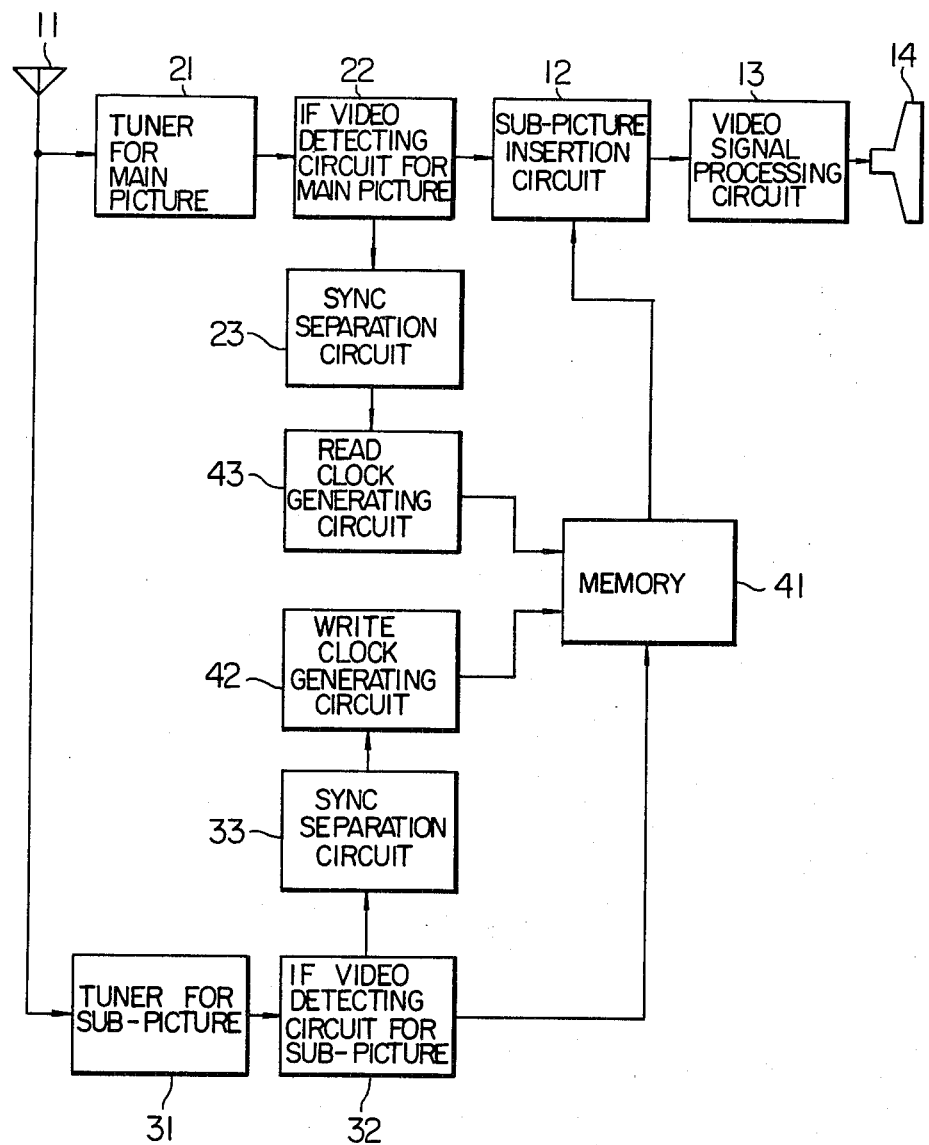
FIG. 3 is a block diagram of the conventional PinP television receiver.
Figure 4:
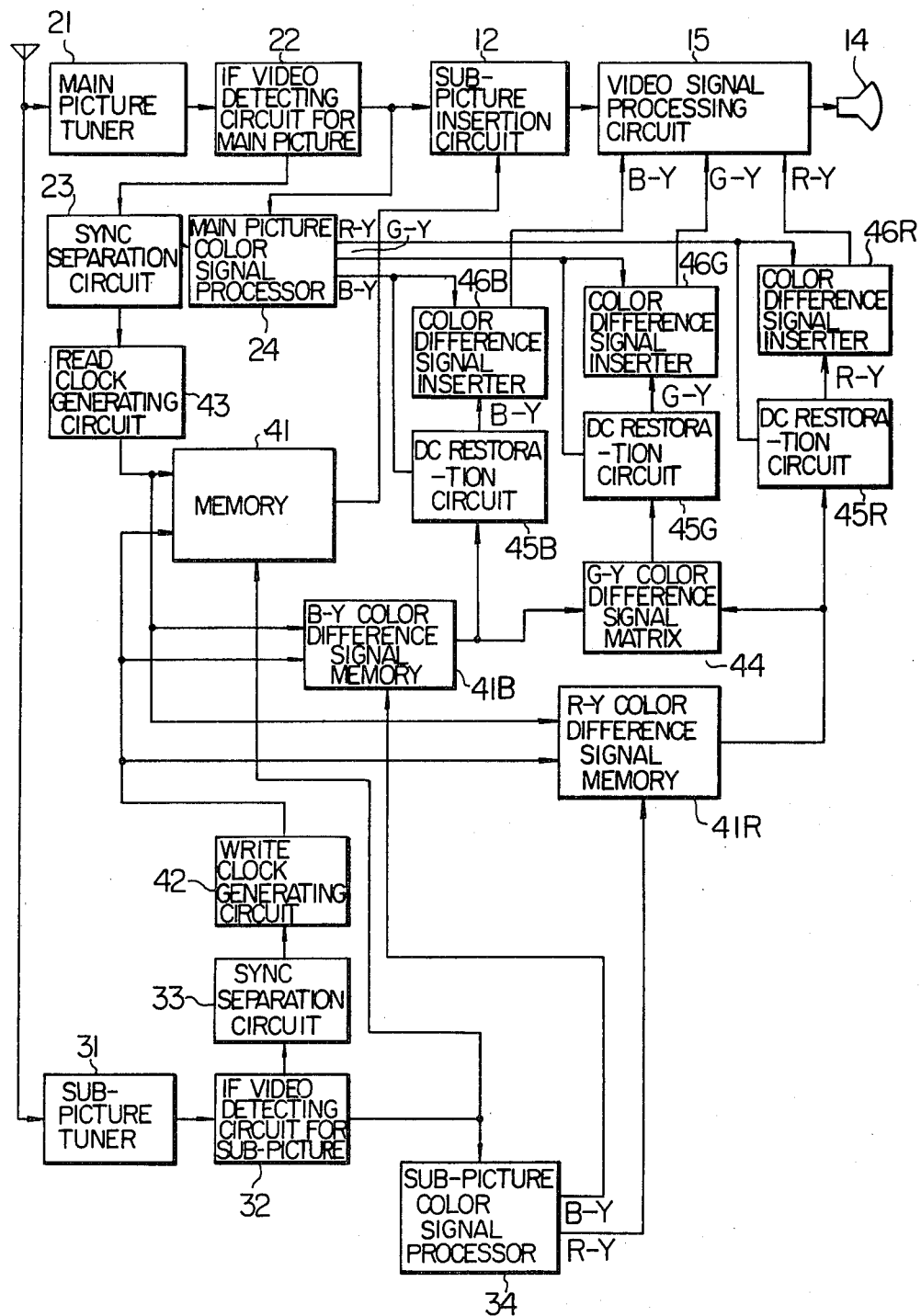
FIG. 4 is a block diagram of an embodiment of a PinP television receiver according to the present invention.

A circuit shown in FIG. 4 corresponds to the conventional circuit shown in FIG. 3 but for further including a means for generating the sub-picture color difference signal and a DC restoration circuit for stabilizing the reference level of the color difference signal in the sub-picture signal. In FIG. 4, like reference numeral designate like or equivalent portions in FIG. 3. The reference level of the color difference signal means an output signal level of an output signal from a demodulator circuit for the color difference signal when the chrominance subcarrier signal is not supplied to the demodulator circuit.

In FIG. 4, 41B designates a B-Y color difference signal memory, 41R an R-Y color difference signal memory, 44 a G-Y color difference signal matrix, 45B, 45G and 45R DC restoration circuit for the respective color difference signals, 46B, 46G and 46R color difference signal inserting circuits for composing the main picture and the sub-picture, 15 a video signal processing circuit, 24 a main picture color signal processing circuit, 34 a sub-picture color signal processing circuit.

The sub-picture color difference signal is properly processed by the sub-picture color signal processing circuit 34. Color difference signals B-Y and R-Y produced from the circuit 34 are stored in the memories 41B and 41R from which these signals are read out in a manner similar to that described relating to FIG. 3. The B-Y color difference signals read out from the B-Y color difference signal memory 41B and the R-Y color difference signal memory 41R are inputted into the G-Y color difference signal matrix circuit 44 which in turn produces the G-Y signal.

The three color difference signals thus obtained are supplied to the color difference signal inserting circuits 46B, 46G and 46R, through DC restoration circuits 45B, 45G and 45R, respectively. Those signals are added to the respective color difference signals of the main picture obtained from the main picture signal processing circuit 24, respectively, and the added ones are supplied to the CRT 14 for display.

The operation of the DC restoration circuit 45B will be described in detail with reference to FIG. 5. The DC restoration circuit 45B is divided into a control signal generating section 110 which receives the reference level of the main picture and produces a control signal corresponding to the reference level, and a DC restoration section 120. The operations of the DC restoration circuits 45G and 45R are the same as that of the DC restoration circuit 45B, and therefore no explanation of those circuits will be given. In FIG. 5, like reference numerals designate like or equivalent portions in FIG. 4. In the Figure, reference numeral 101 designates a DC restoration control signal generating circuit; 102 a power source; 103 a transistor operating as an emitter follower; 104 and 105 capacitors; $S_1$ and $S_2$ switch circuits.

Figure 1:
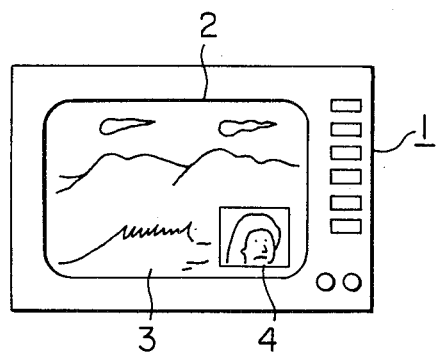
FIG. 1 is a schematic elevation view of a conventional PinP television receiver.
Figure 2:
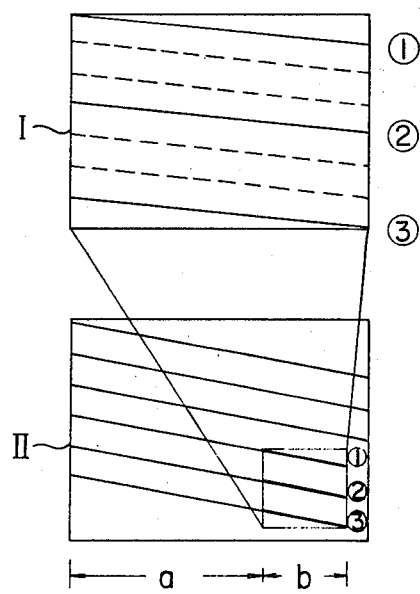
FIG. 2 is a diagram for illustrating scanning lines when the sub-picture is inserted into the main picture in the conventional PinP television receiver.

A switch circuit $S_1$ included in the DC restoration circuit 45B is closed for a given period of a period having no B-Y color difference signal read out from the B-Y memory 41 by a control signal a obtained from the DC restoration control signal generating circuit 101. The given period corresponds to a main picture scanning period (a in FIG. 2) of the horizontal scanning period and the horizontal flyback period. As a result of the closing of the switch circuit $S_1$, the capacitor 105 is charged up to the emitter potential of the transistor 103. During the period other than the above-mentioned one, the switch circuit $S_1$ is kept open. The DC restoration is performed in this way.

The base of the transistor 103 is connected through the switch $S_2$ to the B-Y color signal difference terminal of the main picture color signal processing circuit 24. The switch circuit $S_2$ is closed only during a period that the reference level of the B-Y color difference signal of the main picture is produced, for example, the horizontal flyback period. As a result, the capacitor 104 is charged up to the reference level of the main picture B-Y color difference signal. During the other period than the above-mentioned one, when the switch circuit $S_2$ is opened, the base potential of the transistor 103 is maintained at the reference level of the main picture B-Y color difference signal.

Accordingly, in the DC restoration circuits 45B, 45G and 45R, the reference level of the sub-picture color difference signal depends on the reference level of the main picture color difference signal. As a result, the white balance of the main picture may be coincident with that of the sub-picture on the CRT screen.

As seen from the foregoing, no shift of the white balance of the main picture from that of the sub-picture is attained even when the reference level of the main picture, for example, changes due to temperature drift, by DC-restoring the reference level of the color difference signal of the sub-picture signal with the reference level of the sub-picture color difference signal.

The above-mentioned embodiment has been described by using the PinP television receiver in which the sub-picture (or a size-reduced picture) is inserted into the main picture (or a non-reduction picture). It is evident from the foregoing, however, that the present invention is applicable for a television receiver of the type in which a part of the non-reduction picture or a part of an expanded picture is used as the sub-picture or two or more sub-picture are used.

We claim:

1. A picture-in-picture color television receiver comprising:

(a) a first input terminal for receiving a first television signal for a first picture;

(b) a second input terminal for receiving a second television signal for a second picture;

(c) first separation means for separating the first television signal from said first input terminal into a first luminance component signal, a first color signal component and a first synchronizing component signal to produce them;

(d) second separation means for separating the second television signal from said second input terminal into a second video signal component and a second synchronizing signal component to produce them;

(e) a memory device for storing said second video signal component;

(f) memory write control means which is driven by said second synchronizing signal component to write said video signal into said memory device;

(g) memory read control means which is driven by said first synchronizing signal component to read out said video signal into the output terminal of said memory device;

(h) a first luminance signal demodulation circuit for processing said first luminance signal component received to produce a first luminance signal;

(i) a first color signal demodulating circuit for processing said first color signal component to produce a first color signal, said first color signal demodulating circuit having a specific DC reference level previously set;

(j) third separation means for separating said second picture video signal component derived from the output terminal of said memory device into a luminance signal component and a color signal component to produce a second luminance signal component and a second color signal component;

(k) a second luminance signal demodulating circuit for processing said second luminance signal component received to produce a second luminance signal;

(l) a luminance signal composing circuit for receiving said first and second luminance signals to produce a composite luminance signal in which said second luminance signal is inserted into said first luminance signal;

(m) a second color signal demodulating circuit for processing said second color signal component received to produce a second color signal, said second color demodulating circuit including a DC restoration circuit for restoring a DC component of said second color signal which further includes means for setting said DC reference signal;

(n) a color signal composing circuit for receiving said first and second color signals to produce a composite color signal in which said second color signal is inserted into said first color signal;

(o) means for holding the DC reference level of said first color signal;

(p) first switch means for supplying the DC reference level of said first color signal demodulating circuit to said means for holding the DC reference level of said first color signal during the horizontal flyback period for said first television signal, said first switch being driven by a control signal derived from said memory read control means;

(q) second switch means for supplying the DC reference level derived from said means for holding the DC level of said first color signal into said means for setting said DC reference level, said second switch means being driven by a control signal derived from said memory read control means during a specific period of the flyback period of said first picture and a scanning period of said first picture;

(r) a display device for receiving said composite luminance signal and said composite color signal to simultaneously display said first and second pictures on a screen.

2. A picture-in-picture color television receiver according to claim 1, wherein said means for holding said DC reference level of said first color signal is a transistor which is connected at the base electrode thereof to one end of said first switch means and to one end of a capacitor connected at the other end to ground, at the collector electrode to ground via a power source, and at the emitter electrode to one end of said second switch and to one end of a resistor whose other end is grounded.

* * * * *